United States Patent Office 3,449,368
Patented June 10, 1969

3,449,368
HETEROCYCLIC ALIPHATIC ACIDS
Tsung-Ying Shen and Clifford H. Shunk, Westfield, N.J., assignors to Merck & Co., Inc., Rahway, N.J., a corporation of New Jersey
No Drawing. Filed Dec. 30, 1964, Ser. No. 422,407
Int. Cl. C07d 5/16, 63/12; A61k 27/00
U.S. Cl. 260—332.2
11 Claims

ABSTRACT OF THE DISCLOSURE

The invention relates to new cyclohexyl, furan and thiophene acetic acids and to derivatives thereof. These compounds are useful in that they possess anti-inflammatory activity and can be used to control arthritic conditions.

---

This invention relates to new heterocyclic aliphatic acids, aldehydes, alcohols and to derivatives and intermediates thereof and to process for preparing the same. More specifically, this invention relates to cyclic substituted heterocyclic aliphatic acids and the esters and amides thereof, as well as to the corresponding alcohols, ethers, aldehydes, acetals and non-toxic salts thereof. Still more specifically, this invention relates to substituted furan and thiophene aliphatic acids, alcohols, aldehydes and derivatives thereof. Still more specifically also, this invention relates to compounds having the following formulae:

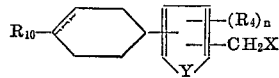

I

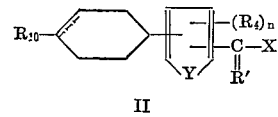

II

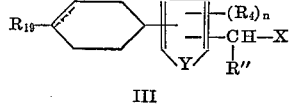

III wherein:

$n$ is a number from zero to two, (— —) is either a double bond (cyclohexenyl) or indicates a saturated position (cyclohexyl), $R_{10}$ is hydrogen, lower alkoxy, benzyloxy or a hydroxy group when (— —) indicates a saturated position, and must be hydrogen when (— —) is a double bond, $R_4$ may be hydrogen, halogen (such as chloro, bromo and the like) or a lower alkyl (such as methyl, ethyl butyl and the like), Y may be oxygen or sulfur, R' is a lower-alkylidene such as methylene or ethylidene, R″ is a lower alkyl group (such as methyl, ethyl, pentyl and the like), and X may be COOH; COOR, where R may be lower alkyl, lower alkenyl (such as prop-2-en, but-3-en, and the like), lower alkynyl (such as prop-2-yn, pent-3-yn), cyclo lower alkyl (such as cyclopropyl, cyclobutyl, cyclopentyl, and the like), phenyl, lower alkanoyl, aminophenyl, carboxyphenyl, carboxamidophenyl, lower alkoxy, lower alkyl (such as methoxymethyl, ethoxymethyl, methoxyethyl, ethoxyethyl, and the like), poly lower alkoxy lower alkyl (such as dimethoxypropyl, diethoxypropyl, and the like), poly hydroxy lower alkyl (such as 1,4-dihydroxybutyl, 2,3-dihydroxypropyl, and the like), di(lower alkyl)amino lower alkyl (such as dimethylaminoethyl, diethylaminoethyl, diethylaminobutyl, and the like); CONH₂;

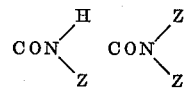

where Z may be lower alkyl, hydroxy lower alkyl (such as hydroxyethyl, 3-hydroxypropyl, 3-hydroxybutyl, and the like), poly hydroxy lower alkyl (such as dihydroxypropyl, dihydroxypentyl, and the like), phenyl lower alkyl (such as phenylethyl, phenylpropyl, phenylbutyl, and the like), phenyl, lower alkoxyphenyl (such as methoxyphenyl, ethoxyphenyl, propoxyphenyl, and the like), halogenophenyl (such as chlorophenyl, fluorophenyl, and the like), trifluoromethylphenyl, cyclohexyl, carboxymethyl, 1-carboxyl-3-carbamyl-propyl, N-di-lower alkyl carboxamidomethyl (such as N,N-dimethylcarboxamidomethyl, N,N-dipropylcarboxamidomethyl, N,N-diethylbutylcarboxamidomethyl, and the like), N,N-di-lower alkylamino lower alkyl (such as dimethylaminoethyl, dipropylaminoethyl, ethylbutylaminoethyl, and the like), N-lower alkyl pyrrolidyl (such as N-methyl-3-pyrrolidyl, N-ethyl-3-pyrrolidyl, and the like), N-lower alkyl pyrrolidyl lower alkyl (such as N-ethyl-2-pyrrolidylmethyl, N-methyl-3-pyrrolidylmethyl, and the like), or Z may form a heterocyclic group with the nitrogen when Z is the group

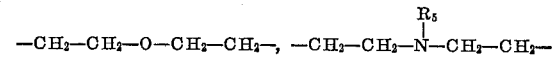

in which $R_5$ is lower alkyl (such as methyl, ethyl, propyl, butyl, and the like),

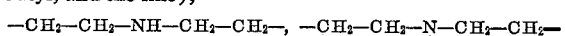
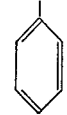

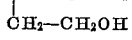

and

—CH₂—CH₂—CH₂—CH₂—CH₂—; CH₂OH; CH₂OR₆ where $R_6$ is lower alkyl (such as ethyl, propyl, butyl, pentyl, and the like); CHO; CH(OR₇)₂ where $R_7$ is lower alkyl (such as ethyl, propyl, butyl, pentyl, and the like); and the pharmaceutically non-toxic salts of the acid. These salts may be the ammonium, alkali and alkali earth, amine, magnesium, aluminum, iron salts, and the like.

The acid side chain and the cyclohexyl group of Formulae I, II and III are in positions on the hetero moiety other than adjacent to each other. In addition, when the hetero moiety is furan, the acid side chain and cyclohexyl group are not in a 2–4 position to each other.

In the more preferred aspects of this invention, X is COOH, $R_{10}$ is hydrogen, the (— —) is a saturated position, $R_4$ is hydrogen or halogen, R' is methylene and R″ is methyl or ethyl but especially methyl. In addition, in the more preferred aspect of this invention, the acid side chain is on the 2 position of the heterocyclic moiety (furan or thiophene), and the cyclohexyl group is on the 4 or 5 position of the heterocyclic moiety but especially on the 5 position.

The intermediate compounds of this invention have the following general formula:

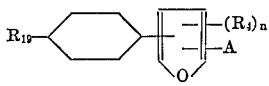

and

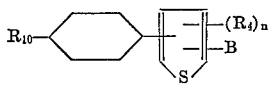

wherein:

A may be —CHO, —COOH,

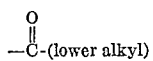

or —HgCl,
B may be —CHO, —CH₂(halogen), —CH₂CN, —COOH,

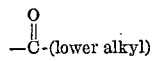

or —HgCl, and
$R_{10}$, $n$ and $R_4$ are as previously defined.

The limitations imposed upon the final compounds apply equally to these intermediates. Also, the preferred compounds of these intermediates correspond to the above described preferred final products of this invention.

We have found that the final compounds described above have antiinflammatory activity and are effective in the prevention and inhibition of granuloma tissue formation. In addition, some of them are of value in the treatment of arthritic and dermatological disorders and in like conditions which are responsive to treatment with antiinflammatory agents. For the above purposes they are normally administered orally in tablets or capsules, the optimum dosage depending on the particular compound being used and the type and severity of the condition being treated. Although the optimum quantities of these compounds to be used will depend on the compound employed and the particular type of disease condition treated, oral dose levels of preferred compounds in the range of 10–2000 mg. per day are useful in control of arthritic conditions, depending on the activity of the specific compound and the reactive sensitivity of the patient.

The compounds of this invention may be prepared from the following type starting material:

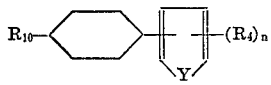

wherein : Y, $R_{10}$ and $(R_4)_n$ are as previously defined.

Many of the compounds indicated by the above formula are compounds known in the literature. In addition, a variety of these compounds may be prepared by a series of well-known reactions. For example, a starting iodo or bromo substituted furan (or thiophene) is subjected to a Grignard reaction (with furan, no Grignard reaction applicable where halide is on 3 position) to form the corresponding magnesium halide compound. The Grignard compound is then reacted with cyclohexanone to yield the corresponding cyclohexen-1-yl heterocyclic compound, which compound is hydrogenated to yield the desired starting material (the cyclohexyl heterocyclic compound). Alternatively, 4-benzyloxy cyclohexanone may be reacted instead of cyclohexanone itself, followed by any known hydrogenation procedure which will saturate the ring but not effect the benzyloxy group. In this latter case, the benzyloxy group is ultimately used, if desired, to form the hydroxy, lower alkoxy group or the 3-ene on the cyclohexyl moiety.

The process of this invention for the preparation of the intermediate and final compounds of Formulae I, II and III will be discussed separately. Furthermore, the first discussion will be limited to the preparation of the acid compounds (X=COOH) of each formula. The preparation of the corresponding ester, aldehydes, alcohols, acetals, ethers and non-toxic salts are discussed subsequently, grouping all the acid compounds of Formulae I, II and III together since the preparation of any of the acid derivatives is similar for any of the acid compounds.

PREPARATION OF FORMULA I COMPOUNDS

The appropriate 2-cyclohexyl heterocyclic starting material may be reacted with liquid HCN at low temperatures with subsequent addition of dry HCl. This reaction mixture is then poured onto ice and partially neutralized (to Congo red) to yield the corresponding 5-cyclohexyl heterocyclic-2-aldehyde compound. The aldehyde is then oxidized to the corresponding heterocyclic-2-carboxylic acid. Alternatively, the appropriate 2-cyclohexyl heterocyclic starting material is added to a mixture of sodium sand in an inert solvent maintained below 0° C. To this reaction mixture is then added a catalytic amount of a solution of amyl chloride in octane and the mixture is heated. The cooled reaction mixture is then added to solid carbon dioxide, water is added and the solution is acidified to yield the corresponding 5-cyclohexyl heterocyclic-2-carboxylic acid compound. The 5-cyclohexyl heterocyclic-2-carboxylic acid prepared from either of the above procedures may be converted to the acetic acid side chain by the well-known Arndt-Eistet method. For example, the carboxyl group is converted to the acid halide, i.e., reaction with thionyl halide. The acid halide is treated with a solution of ethanol-diazomethane to form the corresponding diazoketone compound. This compound is reacted with silver oxide in water to produce the desired 5-cyclohexyl heterocyclic-2-acetic acid compound (using a lower alkanol in place of water above yields the corresponding ester).

When the heterocyclic moiety is thienyl, another procedure is preferred for the preparation of the acid compound. In this case the appropriate 2 or 3 cyclohexylthiophene starting material is reacted with aqueous formaldehyde, concentrated HCl and gaseous hydrogen chloride to form the corresponding -2-thiophene chloromethyl compound. This compound is then treated with a cyanide salt to yield the 2-acetonitrile, and subsequent hydrolysis yields the desired 4 or 5 cyclohexyl -2-thiopheneacetic acid compound.

When the desired Formula I compound is to be the 4 or 5 (cyclohex-3-enyl)-heterocyclic-2-acetic acid, the starting material is to contain the 4-benzyloxycyclohexyl moiety. After preparation of the acid, the benzyloxy group is reduced to the alcohol, which is then converted to the corresponding chloride, i.e., thionyl chloride, and subsequently reacted with basic reagents such as alkali hydroxides and alkoxides or a variety of amines to form the (cyclohex-3-enyl) group.

When it is desired to prepare the 5-cyclohexyl-3-thiopheneacetic acid compound of Formula I, a 2-cyclohexylthiophene or a lower alkyl substituted 2-cyclohexylthiophene compound is brominated so as to add bromine to any unsubstituted positions on the thiophene moiety. This compound is then reduced with aluminum amalgam to yield a 2-cyclohexyl-4-bromothiophene compound. Conversion of this compound to the Grignard reagent followed by reaction with $CO_2$ and hydrolysis yields the 5-cyclohexyl-3-thiophenecarboxylic acid compound. This carboxyl group may then be converted to the acetic acid side chain as previously indicated. (Arndt-Eistet)

The desired 5-cyclohexyl-3-furanacetic acid compound may be prepared by a series of known steps. A 5-cyclohexyl-2-furoic acid, prepared as previously indicated, is reacted with mercuric acetate to form an acetoxymercury furoate compound. This compound is then heated to form a 4-acetoxymercuri compound, and subsequently reacted with sodium-chloride to yield a 4-chloromercuri compound. This compound is then reacted as described on page 15 to yield the corresponding ketone compound and finally converted to the acetic acid side chain by any known reaction (i.e., Willgerodt Reaction).

PREPARATION OF ACID COMPOUNDS OF FORMULA I

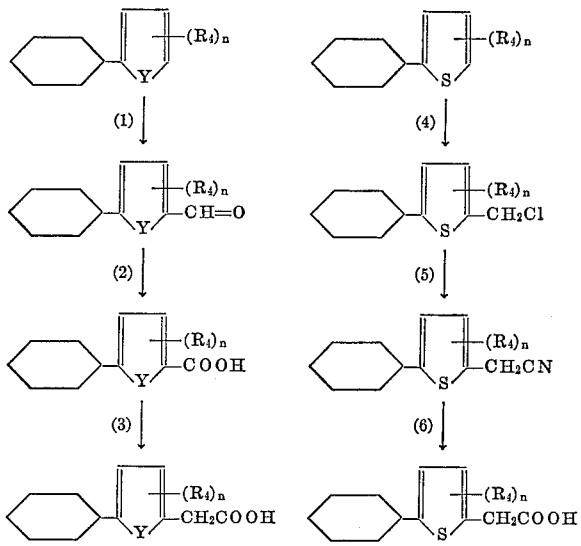

Equivalents—all groups are as previously defined.

REACTION AND CONDITIONS

Step (1).—Reaction with hydrogen cyanide, preferably liquid hydrogen cyanide in an inert solvent such as ether, tetrahydrofuran, dioxane, and the like, preferably ether, followed by addition of a dry hydrohalide (preferably HCl) at a reaction temperature below ambient temperatures (0–25° C.) but preferably at or near 0° C. Subsequent mixing of the reaction mixture with water, ice or ice-water (ice preferred) and neutralization of the aqueous layer with an inorganic base, such as an alkali carbonate, (especially $Na_2CO_3$) followed by heating at elevated temperatures (50–100° C.) preferably at or near the reflux temperature of the system.

Step (2).—Reaction with silver oxide in an inert solvent, such as water-dioxane, and with an alkali or alkali earth hydroxide, such as sodium, magnesium, barium, potassium, and the like (preferably alkali hydroxide), at any suitable temperature 10° C.—reflux) until the reaction is substantially complete.

Step (3).—Reaction according to the Arndt-Eistet method, employing any variable conditions well known in the art.

Step (4).—Reaction with an aqueous concentrated hydrochloric acid-formaldehyde solution at any suitable temperature (0—ambient temperatures) preferably 0–10° C., until the reaction is substantially complete.

Step (5).—Reaction with an alkali or alkali earth cyanide, such as sodium, potassium, magnesium, calcium, barium, and the like (preferably alkali cyanide), in an inert solvent, such as water-alkanol, water-dioxane (preferably water-ethanol), and the like, at elevated temperatures (50° C.—reflux) preferably at or near the reflux until the reaction is substantially complete.

Step (6).—Reaction with an aqueous alkali or alkali earth hydroxide, such as sodium, potassium, magnesium, calcium, barium, and the like (preferably an alkali hydroxide), at elevated temperatures (60° C.—reflux) preferably at or near the reflux temperature of the system until the reaction is substantially complete and subsequently acidification with any suitable acid, such as a mineral acid (HCl, HBr) preferably hydrochloric acid.

In reaction step (1) the quantities used are not critical, only the ultimate yield is affected by varying the quantities. Also the solvent used is not critical and any inert solvent which is capable of at least partially dissolving the reactants may be used. Even though the use of an inorganic base is not absolutely essential in this reaction, it is highly preferred. Any base may be used which will raise the pH of the solution to at least that of the upper limit of Congo red. The isolation of the aldehyde may be accomplished, when desired, by any well-known means, i.e., extraction with ether.

In reaction step (2) any water soluble solvent may be used which is inert to the reaction, such as the preferred water-dioxane, dialkoxyethanes, and the like. The quantities of reactants are not critical in this reaction; therefore, any suitable concentrations may be used. The reaction may be run at 10° C. to reflux, but it is preferred to first initiate the reaction at ambient temperatures followed by heating at elevated temperatures (above 50° C.). In order to go to the next step (3), it is highly preferred to first remove the water present in this reaction mixture since it is necessary to prepare an acid halide. However, it is possible to consume the water present by adding a great excess of the acid halide forming reactant.

Reaction step (3) is the well-known Arndt-Eistet reaction. Any variations which are well-known in the literature and apply to this particular reactant may be used.

In reaction step (4) the quantity of formaldehyde used will effect only the yield obtained, and, therefore, is not critical. The amount of hydrochloric acid in the reaction mixture should be such that the formaldehyde solution is saturated or nearly saturated with hydrogen chloride.

Reaction steps (5) and (6) are well-known reactions, converting a halomethyl to a cyanomethyl and subsequent hydrolysis. Any of the well-known procedures in the art may be used, and the procedures given are simple illustrations of some of them.

FORMULA II COMPOUNDS

The appropriate starting 2-cyclohexyl heterocyclic compound is reacted with mercuric chloride in the presence of an aqueous alkali or alkali earth acetate to produce a 2-cyclohexyl-5-chloromercuri heterocyclic compound. This compound may then be converted to the corresponding 5-lower alkanoyl compound by reaction with a lower alkanoic acid halide in an inert solvent. The 2-cyclohexyl-5-lower alkanoyl heterocyclic compound is then converted to the corresponding 2-cyanohydrin compound which is then treated with a mineral acid to form a 2-(hydroxyamide) compound. The hydroxyamide is subsequently converted to the hydroxy acid which is then reacted with a strong acid to form the desired Formula II compound (α-alkylidene acetic acid compound).

The 5-cyclohexyl-3-lower alkanoylfuran prepared as previously indicated in Col. 5 may be used to prepare the α-alkylidene-5-cyclohexyl-3-furanacetic acid by reacting the ketone as indicated in the series of steps above.

PREPARATION OF COMPOUNDS OF FORMULA II

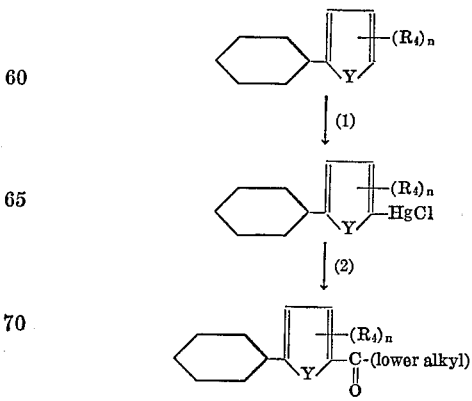

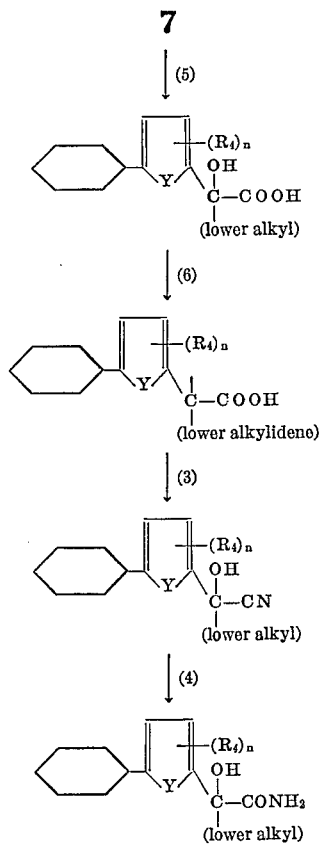

Equivalents.—As previously defined.

REACTIONS AND CONDITIONS

Step (1).—Reaction with mercuric chloride in an aqueous alkali or alkali earth acetate, such as sodium, potassium, calcium, barium, and the like (preferably an alkali acetate), at any suitable temperature (10° C.–50° C.) preferably at ambient temperatures until the reaction is substantially complete.

Step (2).—Reaction with a lower alkanoic acid halide (acetyl chloride, propionyl bromide, valeryl chloride, and the like, preferably acetyl chloride) in an inert solvent, such as acetone, dioxane, ether, tetrahydrofuran, and the like, preferably acetone at any suitable temperature (room temperature—reflux) preferably at elevated temperatures followed by addition to water.

Step (3).—Reaction with a cyano compound, such as sodium cyanide, potassium cyanide, hydrogen cyanide, lower ketone cyanohydrin, and the like [preferably hydrogen cyanide with an amine, such as a primary, secondary, or tertiary aliphatic amine (ethylamine, propylamine, diethylamine, trimethylamine, and piperidine)] in a solvent, such as lower alkanols (methanol, ethanol, propanol, and the like), liquid hydrogen cyanide, ethers, dioxane, tetrahydrofuran, water, mixtures of water and the above organic solvents, lower alkanoic acids (acetic, propionic, and the like), and mixtures of the acids and above solvents, preferably, however, using liquid hydrogen cyanide as the reactant as well as the solvent at any suitable temperature, preferably −10 to 25° C. but especially 0 to 5° C., until the reaction is substantially complete.

Step (4).—Reaction with a mineral acid (hydrogen chloride, hydrogen bromide, sulfuric acid, phosphoric acid, and the like, preferably fortified hydrochloric acid) in an inert solvent, such as lower alkanols (methanol, ethanol, propanol), ether, dioxane, tetrahydrofuran, and the like, preferably employing the acid as the solvent also, between temperatures of 0° and 50° C., preferably at or below room temperature, until the reaction is substantially complete.

Step (5).—Reaction with aqueous alkali or alkali earth hydroxides, such as sodium, potassium, barium, lithium, and strontium hydroxides, or nonaqueous alkali and alkali earth hydroxides with lower alkanols (methanol, propanol, and the like), ethylene glycol, and the like, aqueous ammonium hydroxide, organic amines (such as lower aliphatic amines, and the like), preferably aqueous sodium or potassium hydroxide, but especially concentrated aqueous sodium hydroxide (6–12 N) using the above aqueous hydroxides as the solvents or lower alkanols as the solvents, preferably using the aqueous hydroxide reactants as solvents also, at any suitable temperature (0° C. to reflux) preferably at or near reflux, until the reaction is substantially complete; the resulting reaction mixture is neutralized by any well-known means, to obtain the free acid.

Step (6).—Reaction in an acid medium using strong acids, such as p-toluenesulfonic acid, p-nitrobenzenesulfonic acid, benzenesulfonic acid, trichloroacetic acid, a mixture of acetic acid and sulfuric acid, and the like (preferably toluenesulfonic acid), in an inert solvent, such as aromatic compounds (benzene, toluene, xylene, and the like), dioxane, tetrahydrofuran, lower alkanoic acids (acetic acid, propionic acid, and the like) preferably acetic acid or tetrahydrofuran at elevated temperatures (75° C.–150° C., preferably at or near the reflux temperature of the system) until the reaction is substantially complete.

In step (3) when it is desired to employ the cyanide salt, it is necessary to have the reaction mixture at a pH below 7. This is necessary in order to have the cyanide salt react as the acid. When the preferred procedure is used, namely, using hydrogen cyanide, the use of an amine, such as piperidine or tertiary amine, is highly preferred although not absolutely necessary.

In step (4) an acid condition is necessary to obtain this reaction, and those acids as previously indicated may be used. The reaction may be run above a temperature of 50° C. However, when higher temperatures are used, a mixture of the desired compound as well as the alkylenyl acid is obtained, and it is possible that the reaction may be run at temperatures wherein only the alkylenyl acid compound is obtained.

In step (5) the reaction product is neutralized to obtain the free acid. However, one can use the basic reaction product from this step for use in step (6). In such a case the acid used in step (6) would neutralize the basic solution.

COMPOUNDS OF FORMULA III

The α-alkylidene compounds of Formula II may be reacted with hydrogen to form the desired α-lower alkyl Formula III compounds. Alternatively, the Formula I acid compounds may be converted to the corresponding ester, reacted with a lower alkyl oxalate to form an α-keto ester which in turn is reacted with a lower alkyl halide to replace the α-hydrogen with a lower alkyl group. This compound may then be reacted with an alkali alkoxide followed by neutralization with a dilute mineral acid to form the α-lower alkyl acid compound of Formula III. Further, the hydroxy acid obtained from step (5) Col. 7, may be reacted with phosphorous and iodine to give the Formula III compound directly.

PREPARATION OF COMPOUNDS OF FORMULA III

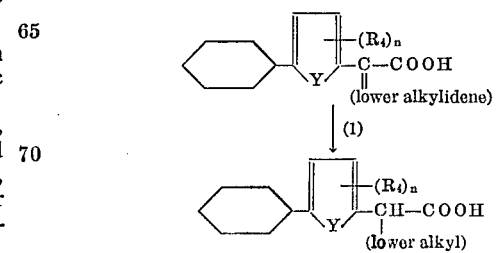

Equivalents.—As previously described.

REACTIONS AND CONDITIONS

Step (1).—Reduction over a catalyst, such as palladium, platinum or Raney nickel, and the like, preferably 5–10% platinum oxide under moderate hydrogen pressure (5–60 pounds, preferably 40 pounds) in an inert solvent, such as lower alkanols (methanol, ethanol, butanol, and the like), aromatic compounds (benzene, toluene, xylene, and the like), tetrahydrofuran, dioxane, acetic acid, and the like, at any suitable temperature (0° C. to reflux), preferably at ambient temperatures in ethanol until the reaction is substantially complete.

The compounds of Formulae I, II and III of this invention wherein X is other than COOH, may be prepared from the corresponding acid compounds.

The process for the preparation of the esters may be carried out by reaction of the corresponding acid with a strong acid, such as hydrochloric acid, sulfuric acid, toluenesulfonic acid, p-nitrotoluenesulfonic acid, benzenesulfonic acid, and the like (preferably 1–3% concentrated sulfuric acid), and with the appropriate alcohol. The alcohol may be used as a solvent also or an inert solvent, such as tetrahydrofuran, ether, or dioxane, may be used. The reaction may be carried out at any suitable temperature; however, it is preferably carried out at or near the reflux temperature of the system. Esterifications are well-known reactions in the art, and although a particular esterification reaction is indicated here, the acid may be esterified by any known means. When the alcohol is not suitable for use as a solvent, inert solvents are used along with the alcohol. When using phenol as the alcohol for the esterification step, it is highly preferred to azetrope the water formed so as to allow ester formation. Another highly suitable procedure for this esterification step is the reaction of the acid with at least one mole of a diimide (such as dicyclohexylcarbodiimide) and the appropriate alcohol in an inert solvent, such as tetrahydrofuran.

The process for the preparation of the amide compounds of this invention may be carried out by reacting the corresponding acid with thionyl chloride, thionyl bromide, phosphorus oxychloride, phosphorus oxybromide, phosphorus pentachloride, or phosphorus pentabromide in an inert solvent—such as ether, benzene, toluene, xylene, tetrahydrofuran, dioxane, and the like—followed by reaction with an excess of the desired amine at any suitable temperature (0° C. to room temperature preferred) or reaction with dicyclohexylcarbodiimide and an excess of the amine at any suitable temperature until the reaction is substantially complete. When primary amides are desired, ammonia may be employed; when secondary amides are required, primary aliphatic or aromatic amines are employed—such as propylamine, benzylamine, β-phenethylamine, aniline, and the like. To obtain cyclic amides, N-unsubstituted cyclic amines—such as pyrrolidine, piperidine, morpholine, and the like—are employed. It is generally preferred to run this reaction with the amine acting as the solvent also; however, when this cannot be conveniently done, an inert solvent such as indicated above may be used. In addition, it is preferred to remove the excess reagent and acidic by-product formed in this reaction prior to the addition of the amine. However, the acid may be neutralized by using an excess of the amine. An alternative procedure is to react the cyclohexyl heterocyclic acetic acid compound with dicyclohexylcarbodiimide and the desired amine. The three components may be mixed at any suitable temperature (−10° C. to 50° C.), but are preferably mixed at ambient temperatures for several hours.

The process for the preparation of the aldehyde compounds of this invention may be carried out by reacting the corresponding cyclohexyl heterocyclic acetic acid compounds with a compound such as thionyl chloride, thionyl bromide, phosphorus pentachloride, phosphorus pentabromide, phosphorus oxychloride, phosphorus oxybromide, and the like, but preferably thionyl chloride in an inert solvent to form the acid halide and subsequent reduction of the acid halide to the aldehyde. The inert solvents used may be benzene, toluene, xylene, ethers (diethyl ether, dioxane), tetrahydrofuran, or the like, preferably benzene or toluene. Any suitable temperature may be employed (room temperature to reflux); however, it is preferred to use temperatures at or near the reflux temperature of the system until the formation of the acid halide is substantially complete. The acid halide is then reacted with a Rosenmund catalyst such as 5% Pd on BaSO$_4$ with quinoline, or with a tritertiarybutoxy alkali or alkali earth aluminum hydride, such as potassium, sodium or lithium aluminum hydride and the like. The reduction is preferably carried out with a tritertiarybutoxy alkali or alkali earth aluminum hydride, particularly with tritertiarybutoxy lithium aluminum hydride in tetrahydrofuran or ether. However, the inert solvent may also be benzene, toluene, xylene, ethers (diethyl ether, dioxane), and the like. The reaction may be carried out at any suitable temperature (−80° C. to room temperature), but preferably −35 to −15° C. until the reaction is substantially complete.

It is preferred to remove the inorganic acid formed after the acid halide preparation; otherwise, the inorganic acid would preferentially consume the subsequent addition of the hydride. However, if it is desired, the inorganic acid may remain if an excess of the hydride is used to react with the inorganic acid as well as with the acid halide. When the butoxide reagent is used, it is preferred to use temperatures below 0° C. If temperatures above 0° C. are used, the reduction will lead to the corresponding alcohol instead of the aldehyde. As indicated, although higher temperatures may be used, it is not economically feasible, for a reaction temperature will be reached wherein the corresponding alcohol will be almost exclusively produced. However, if the alcohol is desired, this is still another way of going directly from the acid to the alcohol.

The process for the preparation of the acetal compounds of this invention may be carried out by reacting the previously prepared aldehyde compound with a lower alkanol in the presence of a strong acid. Examples of strong acids contemplated for this reaction are toluenesulfonic acid, p-nitrobenzenesulfonic acid, and mineral acids (hydrochloric acid, sulfuric acid, and borontrifluoride). It is preferred to use a catalytic amount of toluenesulfonic acid or concentrated hydrochloric acid in a lower alkanol (methanol, ethanol, butanol, and the like) at any suitable temperature. However, the solvents used may be aromatic compounds or combinations of the alcohol and ethers as well as the alcohol itself. The reaction temperature is not critical, and, therefore, temperatures from 0° C. to reflux may easily be used, although ambient temperatures are preferred. The quantity of acid is not critical; all that is required is that the acid be of sufficient strength to catalyze the reaction. Alternatively, the reaction may be carried out by employing the aldehyde and the appropriate lower alkyl orthoformate. When it is desired to isolate the acetal, and water is to be used in the isolation, the reaction mixture must be neutralized with a base such as sodium carbonate so as to prevent the hydrolysis of the acetal back to the aldehyde.

The alcohols of this invention may be obtained by reaction of the corresponding acid compound with an alkali or alkali earth aluminum hydride. Almost any solvent may be used as long as it is inert to the hydride and the reactants have some degree of solubility in it. Preferred inert solvents are tetrahydrofuran and diethyl ether. The temperature of this reaction is not critical; therefore, under these conditions, temperatures from −15° C. to reflux are well within the contemplation of this invention. The complex metal hydrides—such as lithium aluminum hydride, and the like—used may be less than the theoretical amount; however, it is preferred to use 200–400% excess of the preferred lithium aluminum hydried. After the reaction, the excess hydride is decomposed by addition of ethyl acetate or an active hydrogen reactant, such as alcohols, water, or dilute aqueous mineral acids. The alcohol compound obtained from this reaction is in the form of its salt, and therefore an aqueous acid is used to convert the alcohol salt to the free alcohol. Such acids may be hydrochloric, ammonium chloride, sulfuric, and the like. This portion of the reaction is preferably carried out at 0° C. to ambient temperatures by first adding water followed by dilute sulfuric acid. The ester may also be reduced catalytically using such catalyst as reuthenium.

The ether compounds of this invention are prepared from the corresponding alcohols. The alcohol is reacted with a strongly basic condensing agent, such as sodium hydride, potassium hydroxide, potassium tertiary butoxide, or sodamide, and a lower alkyl halide (methyl iodide, allyl, chloride, β-phenethyl bromide, or ethyl bromide and the like), preferably sodium hydride and 50% excess of methyl iodide. Although dimethylformamide is generally used as the solvent, any non-active hydrogen solvent may be used, such as aromatic solvents (benzene, toluene), ethers (diethyl ether, dioxane, tetrahydrofuran), and the like. The reaction is generally carried out at ambient temperatures; however, temperatures from 0–50° C. may be conveniently used also. The quantity of reagents used will affect the yield of the ether; therefore, it is generally preferred to use an excess of the hydride and halide. Additionally, the excess hydride is used to consume any active hydrogen materials which may be present in the starting alcohol compound.

The non-toxic salts of the acid compounds of this invention may be conveniently prepared by procedures well-known in the art. For example, the cyclohexyl heterocyclic acetic acid compound may be reacted with an inorganic base in an inert solvent and the solution evaporated to yield the desired salt.

The following examples are given by way of illustration:

EXAMPLE 1

2-cyclohexylfuran (A) 2 - (1′ - cyclohexenyl)furan.—2-bromofuran (1 mole) in 500 ml. of ether is reacted with 1 mole of magnesium to the resulting Grignard reagent is added dropwise 1 mole of cyclohexanone in 500 ml. of ether, with stirring. After refluxing for 1 hour the mixture is poured into cold dilute acid (hydrochloric acid) and the layers separated. The ether layer is then dried over sodium sulfate, filtered and concentrated. The residue is then distilled yielding 2-(1′-cyclohexenyl)furan. 3 moles of acetyl chloride is then added to the above alcohol which has been placed in 1 liter of methylene chloride and the solution is refluxed for 1 hour. The reaction mixture is then concentrated in vacuo to yield 2-(1′-cyclohexenyl) furan.

(B) 2-cyclohexylfuran.—2-(1′-cyclohexenyl)furan (1 mole) is dissolved in 1 liter of ethanol and the reaction mixture shaken under 45 p.s.i. of hydrogen using 0.5 gram of platinum oxide until 1 mole of hydrogen has been absorbed. The mixture is then filtered and the filtrate concentrated in vacuo to yield 2-cyclohexylfuran.

When 2-bromo-3-methylfuran, 2-bromo-3-ethylfuran,
2-bromo-3-chlorofuran,
2,3-dibromofuran,
2-bromo-4-methylfuran,
2-bromo-3-methylthiophene,
2-bromo-3-ethylthiophene,
2-bromo-3-chlorothiophene,
2,3-dibromothiophene,
2-bromo-4-methylthiophene,
2-bromo-4-chlorothiophene,
2,4-dibromothiophene,
3-bromothiophene,
3-bromo-4-methylthiophene, and 2-methyl-3-bromothiophene is used in place of 2-bromofuran in Part A of the above example, and the product therefrom reacted in accordance with Part B of the above example, there are obtained the corresponding 2-cyclohexyl-3-methylfuran,
2-cyclohexyl-3-ethylfuran,
2-cyclohexyl-3-chlorofuran,
2-cyclohexyl-3-bromofuran,
2-cyclohexyl-4-methylfuran,
2-cyclohexyl-3-methylthiophene,
2-cyclohexyl-3-ethylthophene,
2-cyclohexyl-3-chlorothiophen,
2-cyclohexyl-3-bromothiophene,
2-cyclohexyl-4-methylthiophene,
2-cyclohexyl-4-chlorothiophene,
2-cyclohexyl-4-bromothiophene,
2-cyclohexyl-4-methylthiophene,
3-cyclohexyl-4-methylthiophene,
3-cyclohexylthiophene, and
2-methyl-3-cyclohexylthiophene.

EXAMPLE 2

5-cyclohexyl-2-furaldehyde

To a solution of 1 mole of 2-cyclohexylfuran dissolved in 200 ml. of dry liquid hydrogen cyanide and 500 ml. of ether at −15° C. is added dry hydrogen chloride, maintaining the reaction mixture at 0° C. until the reaction mixture is saturated with hydrogen chloride. The reaction mixture is then allowed to remain overnight at room temperature. The mixture is then pured onto 1 kg. of ice, the ether layer removed and the aqueous layer neutralized with sodium carbonate to Congo red. This reaction mixture is then heated on a steam bath for 1 hour, cooled and extracted with (2×500 ml.) ether. The ether extract is then dried over magnesium sulfate, filtered and concentrated. The residue is then distilled under reduced pressure to yield 5-cyclohexyl-2-furaldehyde.

When the 2-cyclohexyl substituted furans and 2-cyclohexyl substituted thiophenes obtained from Example 1 are used in place of 2-cyclohexylfuran in the above example, there are obtained the corresponding 5-cyclohexyl-2-furaldehyde and 5-cyclohexyl-2-thiophenecarboxaldehyde compounds.

Similarly, when 3-cyclohexylthiophene, 3-cyclohexyl-4-methylthiophene and 2-methyl-3-cyclohexylthiophene obtained from Example 1 are used in place of 2-cyclohexylfuran in the above example, and the product therefrom chromatographed on a silica gel column using petroleum-ether ether as eluent, there are obtained the desired 4-cyclohexyl-2-thiophenecarboxaldehyde, 4-cyclohexyl-3-methyl-2-thiophenecarboxaldehyde and 4-cyclohexyl-5-methyl - 2 - thiophenecarboxaldehyde compounds, respectively.

EXAMPLE 3

5-cyclohexyl-2-furoic acid

An excess of dilute sodium hydroxide is added to an aqueous solution of 4 moles of silver nitrate. The resulting silver oxide is washed well with water and then suspended in 4 liters of dioxane-water (3:1). This suspension is then stirred, and 1 mole of 5-cyclohexyl-2-furaldehyde is added. To this mixture is then added dropwise 1 liter of sodium hydroxide solution in dioxane-water (3:1). The reaction mixture is then stirred for an additional 2 hours and then warmed to 60° C. The reaction mixture is then filtered, and the filtrate acidified with dilute hydrochloric acid. The mixture is concentrated under reduced pressure, the residue is suspended in water and extracted with (2×500 ml.) ether, and the combined ether extracts dried over magnesium sulfate, filtered and concentrated to yield 5-cyclohexyl-2-furoic acid.

When the 2-furaldehyde and 2-thiophenecarboxaldehyde compounds obtained from Example 2 are used in place of 5-cyclohexyl-2-furaldehyde in the above example, there are obtained the corresponding furoic and thiophenecarboxylic acids.

EXAMPLE 4

5-cyclohexyl-2-furanacetic acid 5-cyclohexyl-2-furoic acid (1 mole) is converted to the acid chloride by reaction with 1.5 moles of thionyl chloride at 75° C. The excess thionyl chloride is removed under reduced pressure and the resulting 5-cyclohexyl-2-furoyl chloride is dissolved in 1 liter of ether and added (at 5–10° C.) to a solution of 3 moles of diazomethane in 1 liter of ether. The solution is kept at 20–25° C. for several hours and the ether is then removed under reduced pressure giving 5-cyclohexyl-2-furoyldiazomethane. 0.1 mole of the diazoketone in 100 ml. of dioxane is then added dropwise with stirring to a mixture of 2 grams of silver oxide, 5 grams of sodium carbonate and 3 grams of sodium thiosulfate in 200 ml. of water at 50–60° C. After stirring for an additional hour at 60° C., the temperature of the mixture is raised finally to 100° C. The solution is then cooled, diluted with water, filtered and acidified with dilute nitric acid. The 5-cyclohexyl-2-furanacetic acid which separates is collected.

When the furoic and thiophenecarboxylic acids obtained from Example 3 are used in place of the 5-cyclohexyl-2-furoic acid in the above example, there are obtained the corresponding furanacetic acids and thiopheneacetic acids.

EXAMPLE 5

5-cyclohexyl-2-chloromethylthiophene

A rapid stream of hydrogen chloride is bubbled into a stirred mixture of 1 mole of 2-cyclohexylthiophene, 200 ml. of 40% aqueous formaldehyde and 250 ml. of concentrated hydrochloric acid. After saturation with the gas has occurred, the mixture is poured into 2 liters of water and extracted with (2×500 ml.) ether. The ether solution is then washed with water, dried over potassium carbonate, filtered and concentrated under reduced pressure to yield 5-cyclohexyl-2-chloromethylthiophene.

When the cyclohexylthiophene compounds obtained from Example 1 are used in place of 2-cyclohexylthiophene in the above example, there are obtained the corresponding cyclohexyl-2-chloromethylthiophene compounds.

EXAMPLE 6

5-cyclohexyl-2-thiopheneacetonitrile

A solution of 1 mole of 5-cyclohexyl-2-chloromethylthiophene in 150 ml. of ethanol is added to a solution of 1.2 moles of sodium cyanide in 50 ml. of warm water while stirring over a period of one-half hour. The reaction mixture is then refluxed with stirring for 4 hours, cooled and concentrated in vacuo to remove most of the ethanol. This residue is then partitioned between water and ether (500 ml.–500 ml.). The ether solution is washed with 200 ml. of water, dried over magnesium sulfate, filtered and concentrated under reduced pressure. The residue is then distilled in vacuo to yield 5-cyclohexyl-2-thiopheneacetonitrile.

When the cyclohexyl-2-chloromethylthiophene compounds obtained from Example 5 are used in place of 5-cyclohexyl-2-chloromethylthiophene in the above example, there are obtained the corresponding cyclohexyl-2-thiopheneacetonitrile compounds.

EXAMPLE 7

5-cyclohexyl-2-thiopheneacetic acid

One mole of 5-cyclohexyl-2-thiopheneacetonitrile in 1 liter of 20% aqueous sodium hydroxide is refluxed until the evolution of ammonia ceases. The reaction mixture is then cooled, acidified with hydrochloric acid and concentrated in vacuo to yield 5-cyclohexylthiophene-2-acetic acid.

When cyclohexyl-2-thiopheneacetonitrile compounds obtained from Example 6 are used in place of 5-cyclohexyl-2-thiopheneacetonitrile in the above example, there are obtained the corresponding cyclohexyl-2-thiopheneacetic acid compounds.

EXAMPLE 8

2-cyclohexyl-5-chloromercurifuran

A solution of 1 mole of mercuric chloride in 4 liters of water is added to a solution of 4 moles of sodium acetate in 2 liters of water. The resulting solution is cooled, and 1 mole of 2-cyclohexylfuran is added. The reaction mixture is then stirred at room temperature for 2 days and subsequently cooled in an ice bath. The reaction mixture is then filtered and the cake collected to yield 2-cyclohexyl-5-chloromercurifuran.

When the cyclohexylfuran and cyclohexylthiophene compounds obtained from Example 1 are used in place of 2-cyclohexylfuran in the above example, there are obtained the corresponding cyclohexyl-5-chloromercurifuran and cyclohexyl-5-chloromercurithiophene compounds.

EXAMPLE 9

2-cyclohexyl-5-acetylfuran

To a suspension of 1 mole of 2-cyclohexyl-5-mercurifuran in 500 ml. of acetone is added with stirring 1 mole of acetyl chloride. The reaction mixture is then refluxed for one-half hour, cooled, poured onto ice, made alkaline with aqueous sodium carbonate and filtered. The precipitate and the filtrate are then extracted with (2×500 ml.) ether. The combined ether extracts are then dried, filtered and concentrated. The residue is then distilled in vacuo to yield 2-cyclohexyl-5-acetylfuran.

When propionyl chloride is used in place of acetyl chloride in the above example, there is obtained 2-cyclohexyl-5-propionoylfuran.

Similarly, when the cyclohexyl-5-chloromercurifuran and cyclohexyl-5-chloromercurithiophene compounds obtained from Example 8 are used in the above example in place of 2-cyclohexyl-5-chloromercurifuran, there are obtained the corresponding cyclohexyl-5-acetylfuran and cyclohexyl-5-acetylthiophene compounds.

EXAMPLE 10

α-Hydroxy-α-methyl-5-cyclohexyl-2-furanacetamide

To .01 mole of 2-cyclohexyl-5-acetylfuran is added 2 ml. of liquid hydrogen cyanide with stirring and cooling followed by 5 drops of piperidine. The reaction mixture is kept at 0° C. for 1 hour and then poured into 25 ml. of concentrated hydrochloric acid, which has been cooled to 0° C. The mixture is then saturated with gaseous hydrogen chloride, stirred for 2 hours at 0° C. and then kept overnight at room temperature. The reaction mixture is then extracted well with (2×50 ml.) ether. The combined ether extracts are washed with water, dried over sodium sulfate and concentrated in vacuo to yield α-hydroxy-α-methyl-5-cyclohexyl-2-furancetamide.

When the cyclohexyl-5-acetylfuran, cyclohexyl-5-acetylthiophene compounds and the 2-cyclohexyl-5-propionoylfuran obtained from Example 9 are used in place of 2-cyclohexyl-5-acetylfuran in the above example, there are obtained the corresponding α-hydroxy-α-methyl-cyclohexyl - 2 - furanacetamide, α - hydroxy-α-methyl-cyclohexyl - 2 - thiopheneacetamide compounds and α-hydroxy-α-ethyl-5-cyclohexyl-2-furanacetamide, respectively.

EXAMPLE 11

α-Hydroxy-α-methyl-5-cyclohexyl-2-furanacetic acid

α - Hydroxy-α-methyl - 5-cyclohexyl-2-furanacetamide (.0032 mole) is refluxed overnight in 20 ml. of ethanol-water (1:1) containing 1 gram of sodium hydroxide. There is then added 40 ml. of water and the reaction mixture heated to remove the ethanol. The aqueous alkaline solution is then filtered, neutralized and the resulting mixture extracted well with (2×50 ml.) chloroform.

The combined chloroform extracts are washed with water, dried over sodium sulfate and concentrated in vacuo to yield α-hydroxy-α-methyl-5-cyclohexyl-2-furanacetic acid.

When the α - hydroxy-α-methylcyclohexyl-2-furancetamide, α-hydroxy - α - methylcyclohexyl-2-thiopheneacetamide compounds and the α-hydroxy-α-ethylacetamide compound obtained from Example 10 are used in place of α-hydroxy-α-methyl-5-cyclohexyl-2-furanacetamide in the above example, there are obtained the corresponding α-hydroxy-α-methyl-2-furanacetic acid, α-hydroxy-α-methyl-2-thiophenoneacetic acid compounds and α-hydroxy-α-ethyl-2-furanacetic acid compound.

EXAMPLE 12

α-Methylene-5-cyclohexyl-2-furanacetic acid

A solution of .018 mole of α-hydroxy-α-methyl-5-cyclohexyl-2-furanacetic acid and 2 g. of p-toluenesulfonic acid in 100 ml. of toluene is refluxed for 3 hours. The reaction mixture is cooled, 15 ml. of ether added, and the resulting reaction mixture is washed well with water, the dried over sodium sulfate and concentrated in vacuo to yield a residue of α-methylene-5-cyclohexyl-2-furanacetic acid.

When the α-hydroxy-α-methyl-2-furanacetic acid, α-hydroxy-α-methyl-2-thiopheneacetic acid compounds and α-hydroxy-α-ethyl-2-furanacetic acid compound obtained from Example 11 are used in place of α-hydroxy-α-methyl-5-cyclohexyl-2-furanacetic acid in the above example, there are obtained the corresponding α-methylene-2-furanacetic acid, α-methylene-2-thiopheneacetic acid compounds and α-ethylidene-2-furanacetic acid.

EXAMPLE 13

α-Methyl-5-cyclohexyl-2-furanacetic acid

A solution of .015 mole of α-methylene-5-cyclohexyl-2-furantcetic acid in 25 ml. of ethanol containing 0.1 gram of platinum oxide is treated with hydrogen at room temperature. After the required amount of hydrogen has been taken up, the reaction mixture is filtered and the filtrate concentrated in vacuo to yield a residue of α-methyl-5-cyclohexyl-2-furanacetice acid.

When the α-methylene-2-furanacetic acid, α-methylene-2-thiopheneacetic acid compounds and α-ethylidene-2-furanacetic acid obtained from Example 12 are used in place of α-methylene-5-cyclohexyl-2-furanacetic acid in the above example, there are obtained the corresponding α-methyl-2-furanacetic acid, α-methyl-2-thiopheneacetic acid compounds and α-ethyl-2-furanacetic acid.

EXAMPLE 14

Sodium 5-cyclohexyl-2-furanacetate

A solution of .01 mole of sodium hydroxide in 15 ml. of water is added with stirring to a solution of .01 of 5-cyclohexyl-2-furanacetic acid in 25 ml. of methanol. Additional methanol is added as needed to maintain complete solution, and the solution is stirred for 1 hour. The reaction mixture is then concentrated in vacuo to obtain crude sodium 5-cyclohexyl-2-furanacetate.

When potassium hydroxide is used in place of sodium hydroxide in the above example, there is obtained the corresponding potassium salt.

When the furan- and thiophene-acetic acid compounds obtained from Example 4, the cyclohexyl-2-thiophene-acetic acid compounds obtained from Example 7, the α-methylene-(thiophene and furan) acetic acid compounds and α-ethylidene-acetic acid compound obtained from Example 12, and the α-methyl-(thiophene and furan) acetic acid compounds and α-ethyl-acetic acid compound obtained from Example 13 are used in place of the 5-cyclohexyl-2-furanacetic acid in the above example, there are obtained the corresponding sodium salts of these acids.

EXAMPLE 15

β-(5-cyclohexyl-2-furan)-ethanol

To a well-stirred suspension of .005 mole of lithium aluminum hydride in 50 ml. of anhydrous ether is added dropwise a solution of .01 mole of 5-cyclohexyl-2-furanacetic acid with ice-cooling. The reaction mixture is stirred at room temperature for 1 hour, after which 10 ml. of water is added dropwise with ice-cooling. This reaction mixture is poured into dilute sulfuric acid, made slightly alkaline with water, and the aqueous layer is extracted well with 2.5 ml. of chloroform. The combined chloroform extracts are washed with water, dilute bicarbonate and water, then dried over sodium sulfate and concentrated in vacuo to yield a residue of β-(5-cyclohexyl-2-furan)-ethanol.

When the furan and thiopheneacetic acid compounds obtained from Example 4, the cyclohexyl-2-thiopheneacetic acid compounds obtained from Example 7, the α-methylene-(thiophene and furan)acetic acid compounds and α-ethylideneacetic acid compound obtained from Example 12, and the α-methyl-(thiophene and furan)acetic acid compounds and α-ethylacetic acid compound obtained from Example 13 are used in place of the 5-cyclohexyl-2-furanacetic acid in the above example, there are obtained the corresponding alcohols.

EXAMPLE 16

5-cyclohexyl-2-(β-methoxyethyl)-furan

To a well-stirred suspension of .01 mole of sodium hydride in 25 ml. of dry dimethylformamide which has been cooled to 0° C. is added a solution of .01 mole of β-(5-cyclohexyl-2-furan)-ethanol in 10 ml. of dimethylforamide. The reaction mixture is stirred for 15 minutes, whereupon .015 mole of methyl iodide is added dropwise and the mixture allowed to stir overnight at room temperature. 200 ml. of water is added and the resulting mixture extracted well with chloroform. The chloroform extract is then washed with water, dried over sodium sulfate and concentrated in vacuo to yield 5-cyclohexyl-2-(β-methoxyethyl)-furan.

When ethyl iodide, allyl bromide, benzyl chloride and ethoxyethyl chloride are used in place of methyl iodide in the above example, there are obtained the corresponding ethoxy, allyloxy, benzyloxy and ethoxyethoxy ethyl compounds.

When the alcohol compounds obtained from Example 15 are used in place of β-(5-cyclohexyl-2-furan)-ethanol in the above example, there are obtained the corresponding ethers.

EXAMPLE 17

5-cyclohexyl-2-furanacetaldehyde (A) 5-cyclohexyl-2-furanacetyl chloride.—To a solution of .01 mole of 5-cyclohexyl-2-furanacetic acid in 50 ml. of benzene is added .11 mole of thionyl chloride. The reaction mixture is then heated on a steam bath for 1 hour and concentrated in vacuo to remove the solvent and any excess thionyl chloride.

(B) 5-cyclohexyl-2-furanacetaldehyde.—To a suspension of .01 mole of lithium tritertiary-butoxy aluminum hydride in 50 ml. of dry tetrahydrofuran at −10° C. is added dropwise with stirring a solution of .01 mole of 5-cyclohexyl-2-furanacetyl chloride in 25 ml. of dry tetrahydrofuran. The reaction mixture is then stirred at −10° C. for 3 hours, followed by the addition of 200 ml. of 5% sulfuric acid, made slightly alkaline with ammonia and the resulting mixture extracted well with (2×500 ml.) chloroform. The combined chloroform extracts are washed with water, dried over sodium sulfate and concentrated in vacuo to yield crude 5-cyclohexyl-2-furanacetaldehyde.

When the furan- and thiophene-acetic acid compounds obtained from Example 4, the cyclohexyl-2-thiopheneacetic acid compounds obtained from Example 7, the α-methylene-(thiophene and furan)acetic acid compounds and α-ethylidene-acetic acid compound obtained from Example 12, and the α-methyl-(thiophene and furan)acetic acid compounds and α-ethyl-acetic acid compound obtained from Example 13 are used in place of 5-cyclohexyl-2-furanacetic acid in part A of the above example and the product therefrom reacted in accordance with part B of the above example, there are obtained the corresponding aldehydes.

EXAMPLE 18

5-cyclohexyl-2-furanacetaldehyde dimethylacetal

To a solution of .01 mole of 5-cyclohexyl-2-furanacetaldehyde in 100 ml. of anhydrous methanol is added .001 mole of p-toluenesulfonic acid. The reaction mixture is stirred at room temperature for 2 days. A solution of sodium methoxide in methanol is added until the solution is just alkaline to moistened litmus paper. The methanol is removed in vacuo and the residue taken up in ether and washed well with water. The ether solution is dried over sodium sulfate and concentrated in vacuo to yield a residue of 5-cyclohexyl-2-furanacetaldehyde dimethylacetal.

When ethanol, n-propanol, and n-butanol are used in place of methanol, there are obtained the corresponding diethyl, dipropyl, and dibutyl acetals.

When the aldehyde compounds obtained from Example 17 are used in place of 5-cyclohexyl-2-furanacetaldehyde in the above example, there are obtained the corresponding dimethylacetal compounds.

EXAMPLE 19

5-cyclohexyl-2-furan acetamide 5-cyclohexyl-2-furanacetic acid (.05 mole) is slowly treated with 0.2 mole of thionyl chloride. The resulting mixture is heated on a steam bath for 2 hours and the excess thionyl chloride is removed in vacuo. To this residue is added 40 ml. of 1,2-dimethoxyethane and the reaction mixture is then added dropwise to 100 ml. of stirred ammonium hydroxide solution (approximately 30%) with ice-cooling. The 5-cyclohexyl-2-furan acetamide is collected, washed with water and dried in vacuo.

When methylamine, ethanolamine, propylamine, 2,3-dihydroxybutylamine, benzylamine, aniline, o-methoxyaniline, p-ethoxyaniline, m-trifluoromethylaniline, cyclohexylamine, carbobenzyloxymethylamine, carboxymethylamine, glutamine, aminomethyl pyrrolidine, 3-aminomethyl-1-ethylpyrrolidine, morpholine, piperazine, piperidine and pyrrolidine are used in the above example in place of ammonium hydroxide, there are obtained the corresponding substituted amides.

When the furan- and thiophene-acetic acid compounds obtained from Example 4, the cyclohexyl-2-thiopheneacetic acid compounds obtained from Example 7, the α-methylene-(thiophene and furan)-acetic acid compounds and α-ethylideneacetic acid compound obtained from Example 12, and the α-methyl-(thiophene and furan)-acetic acid compounds and α-ethylacetic acid compound obtained from Example 13 are used in place of 5-cyclohexyl-2-furanacetic acid in the above example, there are obtained the corresponding amides.

EXAMPLE 20

Methyl 5-cyclohexyl-2-furanacetate

A mixture of .01 mole of 5-cyclohexyl-2-furanacetic acid in 6.0 g. of concentrated sulfurnic acid and 250 ml. of anhydrous methanol (approximately 3% sulfuric acid) is stirred at room temperature overnight. The solution is then concentrated in vacuo to approximately one-third the volume, 80 ml. of water is added, the solution is made alkaline with potassium bicarbonate and the mixture extracted with (3×50 ml.) chloroform. The combined extracts are washed with saturated potassium bicarbonate solution and water. The ether solution is then dried over magnesium sulfate, filtered and concentrated in vacuo to yield crude methyl 5-cyclohexyl-2-furanacetate.

When the furan- and thiophene-acetic acid compounds obtained from Example 4, the cyclohexyl-2-thiopeneacetic acid compounds obtained from Example 7, the α-methylene-(thiophene and furan)-acetic acid compounds and α-ethylideneacetic acid compound obtained from Example 12, and the α-methyl-(thiophene and furan)-acetic acid compounds and α-ethyl-acetic acid compound obtained from Example 13 are used in place of 5-cyclohexyl-2-furanacetic acid in the aboxe example, there are obtained the corresponding methyl acetates.

When ethanol, n-propanol and n-butanol are used in place of methanol in the above example, there are obtained the corresponding ethyl, n-propyl and n-butyl acetates.

What is claimed is:
1. A compound of the formula:

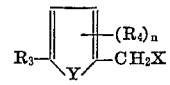

wherein
R₃ is cyclohexyl;
R₄ is halogen;
n is zero or one;
X is COOH; and
Y is oxygen or sulfur.
2. 5-cyclohexyl-2-furanacetic acid.
3. 5-cyclohexyl-2-thiopheneacetic acid.
4. 5-cyclohexyl-4-chloro-2-thiopheneacetic acid.
5. 5-cyclohexyl-4-chloro-2-furanacetic acid.
6. A compound of the formula:

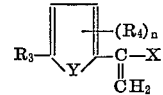

wherein
R₃ is cyclohexyl;
R₄ is halogen;
n is zero or one;
X is COOH;
Y is oxygen or sulfur.
7. A compound of the formula:

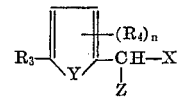

wherein
R₃ is cyclohexyl;
R₄ is halogen;
n is zero or one;
X is COOH;
Y is oxygen or sulfur; and
Z is methyl or ethyl.

8. α-Methyl 5-cyclohexyl-2-furanacetic acid.
9. α-Methyl 5-cyclohexyl-2-thiopheneacetic acid.
10. α-Methyl 5-cyclohexyl-4-chloro-2-furanacetic.

11. α-Methyl 5 - cyclohexyl - 4 - chloro-2-thiophene-acetic acid.

References Cited

UNITED STATES PATENTS

| | | | |
|---|---|---|---|
| 2,721,870 | 10/1955 | Pines | 260—332.3 |
| 3,002,002 | 9/1961 | Wender et al. | 260—332.2 |

OTHER REFERENCES

Alles, Journal of Pharm. and Expt. Therap., 72:265–75 (1941).

Buu Hoi, et al., Chemical Abstracts, 50:1753g (1956).

Fieser, et al., Organic Chemistry, 1950 p. 50 relied on.

Pines, et al., Chemical Abstracts, 45:2467d (1951).

Cecil, et al., Textbook of Medicine (Saunders, Phila, 1955), pp. 1415–1417.

NORMA S. MILESTONE, *Primary Examiner.*

C. M. SHURKO, *Assistant Examiner.*

U.S. Cl. X.R.

260—247.1, 247.2, 268, 293.4, 294, 326.3, 329, 332.3, 332.5, 346.1, 347.3, 347.4, 347.5, 347.8, 999